United States Patent Office 3,420,826
Patented Jan. 7, 1969

---

3,420,826
2,4,6-(SUBSTITUTED)-1,3,4-OXADIAZINES AND METHOD FOR THEIR PREPARATION
Donald L. Trepanier, Indianapolis, Ind., assignor to The Dow Chemical Company, Midland, Mich., a corporation of Delaware
No Drawing. Continuation-in-part of application Ser. No. 395,552, Sept. 10, 1964. This application Sept. 28, 1966, Ser. No. 582,551
U.S. Cl. 260—244        29 Claims
Int. Cl. C07d 87/52

---

ABSTRACT OF THE DISCLOSURE 2,4,6-(substituted)-4H - 1,3,4 - oxadiazine compounds such as 2 - (m-chlorophenyl)-5,6-dihydro-4,6,6-trimethyl-4H-1,3,4-oxadiazine are prepared by various procedures. The compounds are useful as sedatives, as anticonvulsants and as pesticides.

---

This is a continuation-in-part of my application, Ser. No. 395,552, filed September 10, 1964, now abandoned.

This invention is concerned with new compounds and is particularly directed to novel 2,4,6-substituted-4H-1,3,4-oxadiazines and their mineral acid salts and to a method for the preparation thereof.

The compounds of the invention are represented by the following formula

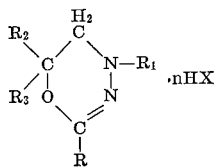

I wherein R represents furyl, benzyl, styryl, methylenedioxyphenyl, phenyl, or substituted phenyl, $R_1$ $R_2$ and $R_3$ each independently represent hydrogen or methyl, $n$ is an integer from zero to one and HX represents one equivalent of a mineral acid. The term "substituted phenyl" as employed herein is inclusive of halophenyl, alkoxyphenyl, alkylphenyl, hydroxyphenyl and nitrophenyl groups, that is, phenyl groups substituted with from one to three substituents selected from halogen, lower alkoxy, lower alkyl, hydroxy and nitro groups. The terms "lower alkyl" and "lower alkoxy" as employed herein refer to such groups containing from 1 to 4 carbon atoms. The new compounds are high-boiling liquids or crystalline solids, somewhat soluble in organic solvents such as chloroform and lower alkanols, and relatively insoluble in water. The hydrohalide salts are crystalline solids which are slightly soluble in water and soluble in polar organic solvents such as methanol and dimethylformamide. The novel compounds have been found to be useful as sedatives and anticonvulsants and have been found to be particularly useful for administration to laboratory animals in studying the behavior thereof and in ascertaining drug effects on the central and peripheral nervous system. Certain of the novel compounds have also been found to be useful as pesticides for the control of such representative organisms as fungi, helminths, nematodes and plants.

The novel oxadiazines corresponding to the formula

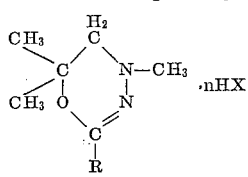

($R_1 = R_2 = R_3 = CH_3$ in Formula I)

can be prepared by the cyclodehydration of a substituted hydrazide or 2-(β-hydroxyalkyl) acid hydrazide of the formula

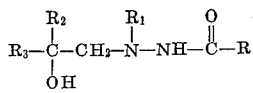

III wherein $R_1$, $R_2$ and $R_3$ each represent methyl. In this and succeeding formulae, R has the significance set forth in Formula I above and $R_1$, $R_2$ and $R_3$ have the significance hereinafter described. The cyclodehydration can be accomplished by dissolving the substituted hydrazide in an inert solvent such as methylene chloride or chloroform and dispersing the resulting solution in concentrated sulfuric acid at room temperature. The cyclodehydration reaction is initiated readily when the substituted hydrazide is contacted with the concentrated sulfuric acid and is generally complete within about 30 minutes. Thereafter, the product may be obtained by diluting the acid, for example on crushed ice, and extracting the resulting mixture with chloroform. The chloroform extract is then worked up by conventional procedures such as washing and evaporation under reduced pressure to obtain the desired oxadiazine product as a residue. The latter, if crystalline, may be further purified by recrystallization from suitable organic solvents. When the oxadiazine product is an oily liquid, it can conveniently be converted into a crystalline hydrohalide salt by dissolving it in an anhydrous solvent such as isopropyl alcohol and adding thereto a solution of a hydrohalide such as hydrogen chloride or hydrogen bromide in diethyl ether. This procedure precipitates the corresponding hydrohalide salt of the oxadiazine product which may then be recrystallized in conventional fashion.

Alternatively, the cyclodehydration of the substituted hydrazide may be accomplished by dissolving said hydrazide in glacial acetic acid and saturating the resulting solution with hydrogen bromide. In this mode of operation, the oxadiazine product is produced in the form of the hydrobromide salt in the reaction mixture and may be recovered as a residue by distillation of the acetic acid under vacuum. The resulting substituted oxadiazine hydrobromide may be purified in conventional fashion as by recrystallization.

The 2-(β-hydroxyalkyl)hydrazides employed as starting materials for preparing the compounds of Formula II may be produced starting from isobutylene oxide. The latter is reacted with methyl hydrazine in the presence of a small amount of sodium hydroxide as catalyst to produce 2 - methyl-2-(β-hydroxy-β-methylpropyl)-hydrazine. One molar proportion of this hydrazine is reacted with two molar proportions of an acyl chloride having the formula RCOCl to produce an ester-hydrazide having the formula:

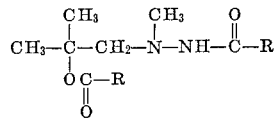

III(a)

The latter reaction is conveniently carried out in the presence of two molar proportions of a hydrogen chloride acceptor such as pyridine. The resulting ester-hydrazides can then be selectively hydrolyzed in an alcoholic solution of sodium hydroxide containing alkali equivalent to from about 0.05 N to 0.15 N sodium hydroxide to produce the desired 2-methyl-2-(β-hydroxy-β-methylpropyl) acylhydrazide starting materials. Characteristic melting points and recrystallization solvents for representative species of such hydrazides, having the indicated acyl groups as substituents, are summarized in the following table.

| Acyl Substituent | Recrystallization Solvent | Melting Point, °C. |
| --- | --- | --- |
| p-Chlorobenzoyl | Isopropanol-ether | 118–120 |
| 3,4,5-trimethoxybenzoyl | Ethyl acetate | 148–149 |
| 2,4-dichlorobenzoyl | do | 104–106 |
| 3,4-dichlorobenzoyl | do | 96–97 |
| o-Toluyl (hydrobromide) | Isopropanol | 140–141 |
| p-Toluyl | Ethyl acetate | 122–123 |
| m-Toluyl | Ether | 87.5–88.5 |
| o-Anisoyl (hydrobromide) | Isopropanol | 151–153 |
| p-Nitrobenzoyl | Ethyl acetate | 150–152 |
| p-Fluorobenzoyl | do | 130–131 |
| 2,4-dimethylbenzoyl | Benzene | 86–89 |
| 2,5-dimethylbenzoyl | do | 115–116 |
| 3,4-dimethylbenzoyl | Ethyl acetate | 133–135.5 |
| 3,5-dimethylbenzoyl | do | 133.5–135 |
| m-Chlorobenzoyl | Benzene | 90–91.5 |

The novel oxadiazine compounds corresponding to the formula

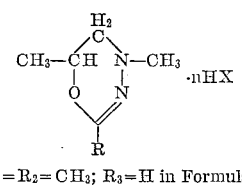

$(R_1 = R_2 = CH_3;\ R_3 = H\ \text{in Formula I})$ wherein, if R is substituted phenyl, the substituents are in the meta and para positions, are prepared by the simultaneous dehydration and cyclization of a 2-methyl-2-(β-hydroxypropyl)acylhydrazide corresponding to the formula

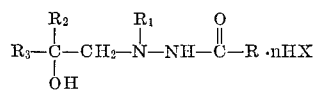

wherein $R_1$ and $R_2$ each represent methyl, $R_3$ represents hydrogen and $n$ and HX have the significance set forth in Formula I above. In obtaining the oxidiazine, an acylhydrazide corresponding to Formula V is reacted with glacial acetic acid saturated with hydrogen bromide. In the preferred method of operation, the hydrazide is dissolved in excess glacial acetic acid and the solution is saturated with hydrogen bromide gas. The reaction proceeds at temperatures of from about 20° to 150° C. and is preferably carried out at about 25°–50° C. The dehydrocyclization proceeds readily when the reagents are contacted, some of the product being obtained when contact times from a few minutes up to 24 hours or more are employed. Reaction times of from about 20 minutes to a few hours are preferred. In this method of preparation, the oxadiazine compound is produced in the form of the hydrobromide salt in the reaction mixture and may be recovered and purified by conventional methods as described above. The oxadiazine compounds in free base form can be obtained by treatment of the hydrobromide salt with a dilute alkaline solution followed by extraction or the like.

The oxadiazine compounds corresponding to Formula IV cannot be prepared by cyclodehydration of a 2-(β-hydroxypropyl)acylhydrazide in concentrated sulfuric acid. In sulfuric acid, hydrazide cleavage takes place releasing the substituted acid.

The 2-(β-hydroxypropyl)acylhydrazides employed as starting materials for preparing the 4,6-dimethyl oxadiazine compounds of the invention may be produced by reacting a substituted acyl halide with a 1-(α-methylhydrazino)-2-propanol. The reaction takes place in the presence of a hydrogen chloride acceptor such as triethylamine or pyridine. The reaction is conveniently carried out in the presence of an inert organic solvent such as chloroform or ethylene dichloride, from which the product may be separated by conventional methods such as distillation and evaporation of the solvent. The substituted acyl halide can be conveniently prepared by reacting a substituted organic carboxylic acid compound with thionyl chloride or thionyl bromide.

Characteristic melting points and recrystallization solvents for representative species of the acylhydrazides, having the indicated acyl groups as substituents, are summarized in the following table.

| Acyl Substituent | Recrystallization Solvent | Melting Point, °C. |
| --- | --- | --- |
| p-Anisoyl | Ethyl acetate | 126–128 |
| Benzoyl | do | 110–113 |
| p-Chlorobenzoyl | Toluene | 92–94 |
| m-Chlorobenzoyl (hydrobromide) | Ethanol | *181–183 |
| 3,5-dimethylbenzoyl | Diethyl ether | 93–94 |
| α-Toluyl | Ethyl acetate | 94–95 |
| p Toluyl | do | 114–115 |
| m,p-Veratroyl | do | 130–131 |

*Compound decomposed at indicated temperature.

The novel oxadiazine compounds of the formula

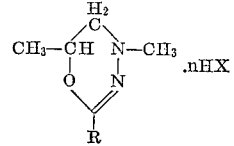

$(R_1 = R_2 = CH_3;\ R_3 = H\ \text{in Formula I})$ wherein R is ortho-substituted phenyl can be prepared by preparation of a 2-methyl-2-(β-toluenesulfonyloxypropyl)-hydrazide of an ortho-substituted benzoic acid followed by simultaneous tosyl displacement and ring closure of the tosyl ester-hydrazide. This method is described and claimed in my copending application, Serial No. 582,552, filed concurrently herewith. The compounds of Formula VI cannot be formed by cyclodehydration of a 2-(β-hydroxypropyl)-o-(substituted)benzoic acid hydrazide corresponding to Formula V in sulfuric acid. The sulfuric acid reaction results in hydrazide cleavage and liberation of the substituted acid rather than formation of the desired oxadiazine compound. In the glacial acetic acid and hydrogen bromide reaction medium described above, the o-substituted benzoic acid hydrazides are not cyclodehydrated to form oxadiazines, but yield a mixture of the hydrazide starting material and a 2-(β-acetoxypropyl) acid hydrazide.

The novel oxadiazines corresponding to the formula

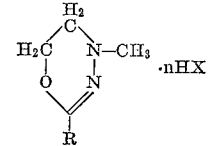

can be prepared by the base catalyzed dehydrohalogenation of a 2-(β-haloethyl) acid hydrazide. This method is disclosed and claimed in my copending application, Serial No. 582,548, filed concurrently herewith. The 4-methyl-oxadiazine compounds cannot be produced from a 2-(β-hydroxyalkyl) acid hydrazide corresponding to Formula III wherein $R_1$ represents methyl and $R_2$ and $R_3$ each represent hydrogen by either of the acid catalyzed methods described above. The 2-(β-hydroxyethyl) acid hydrazides undergo hydrazide cleavage in concentrated sulfuric acid or polyphosphoric acid. In glacial acetic acid and hydrogen bromide, the hydrazides react to form 2-(β-acetoxyethyl) acid hydrazides.

The oxadiazine compounds corresponding to the formula

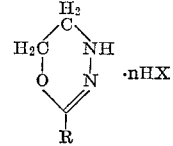

can be prepared by the reaction of an acid hydrazide with an ethylene dihalide in the presence of a base. This method is disclosed and claimed in my copending application, Ser. No. 582,550, filed concurrently herewith. The oxadiazine compounds corresponding to Formula VIII cannot be prepared by the above-described methods involving acid-catalyzed cyclodehydration of an acid hydrazide.

The following examples illustrate the invention but are not to be construed as limiting the same.

Example 1.—Thirty grams (0.096 mole) of 3,4,5-trimethoxybenzoic acid 2 - (β - hydroxy-β-methylpropyl)-2-methylhydrazide was dissolved in methylene chloride and the resulting solution added dropwise with stirring to 100 milliliters of concentrated sulfuric acid at room temperature. On completion of the addition, the reaction mixture was stirred for 30 minutes and then poured into a mixture of crushed ice and chloroform. Two liquid layers formed and the organic layer was separated and preserved. The acidic aqueous layer was extracted with three successive portions of chloroform and the chloroform extracts combined with the previously-separated organic layer. The combined organic solution was washed successively twice with aqueous sodium hydroxide solution and twice with water and then dried over anhydrous magnesium sulfate overnight. From the dried solution, the solvents were removed by evaporation under reduced pressure to obtain the crude product as a white crystalline residue. The latter was recrystallized from isopropanol to obtain the 2-(3,4,5-trimethoxyphenyl) - 5,6-dihydro-4,6,6-trimethyl-4H-1,3,4-oxadiazine product as a white crystalline solid melting at 120°–121° C. The infrared spectrum of this product was in agreement with the assigned structure.

Example 2.—Fifteen grams (0.051 mole) of 2,4-dichlorobenzoic acid 2-(β-hydroxy-β - methylpropyl) - 2-methylhydrazide was dissolved in methylene chloride and the resulting solution added to 100 milliliters of concentrated sulfuric acid with stirring at room temperature. The resulting mixture was stirred for three hours, left standing for about 16 hours additional and then poured onto crushed ice. The resulting aqueous acidic slurry was extracted four times with chloroform. The chloroform extracts were combined and washed twice with 100-milliliter portions of aqueous 1 N sodium hydroxide solution and thereafter once with water and then dried over anhydrous magnesium sulfate. The dried chloroform solution was evaporated under vacuum to obtain the crude oxadiazine product as a light yellow oil. The latter was dissolved in methanol and to the resulting solution was added a solution of hydrogen chloride in diethyl ether to precipitate a 2-(2,4-dichlorophenyl)-5,6-dihydro-4,6,6-trimethyl-4H-1,3,4 - oxadiazine hydrochloride product as white crystals melting at 166°–168.5° C. with decomposition.

Example 3.—Following the general procedure of Example 2, approximately 0.05 mole of 3,4-dichlorobenzoic acid 2-(β-hydroxy-β-methylpropyl)-2-methylhydrazide was cyclodehydrated in concentrated sulfuric acid and the product worked up as in said example to obtain a 2-(3,4-dichlorophenyl)-5,6-dihydro-4,6,6-trimethyl - 4H - 1,3,4-oxadiazine hydrochloride product melting at 185°–194° C. with decomposition.

In substantially the same procedure, p-butoxybenzoic acid 2-(β-hydroxypropyl)-2-methylhydrazide was cyclodehydrated and the product worked up with ethereal hydrogen chloride to obtain a 2-(p-butoxyphenyl)-5,6-dihydro-4,6,6-trimethyl-4H-1,3,4 - oxadiazine hydrochloride product melting at 144.5°–147° C.

Example 4.—Forty grams of m-toluic acid 2-(β-hydroxy-β-methylpropyl)-2-methylhydrazide was dissolved in 1000 milliliters of glacial acetic acid and the resulting solution saturated with hydrogen bromide by bubbling hydrogen bromide gas into the solution. Thereafter, the acetic acid was evaporated from the solution under vacuum to leave the crude product as a residue. This residue was dissolved in methanol and ethyl ether added to the resulting solution until the product crystallized. The crystalline product was recrystallized from isopropyl alcohol to obtain 2-(m-tolyl)-5,6-dihydro-4,6,6-trimethyl-4H-1,3,4-oxadiazine as the hydrobromide salt melting at 193°–194.5° C. with decomposition and containing 52.85 percent carbon, 6.59 percent hydrogen and 9.43 percent nitrogen by analysis as compared to theoretical values of 52.40 percent, 6.08 percent and 9.39 percent, respectively, calculated for said hydrobromide salt. The infrared spectrum of this compound was in agreement with the assigned structure.

Example 5.—The procedure of Example 2 was repeated except that p-chlorobenzoic acid 2-(β-hydroxy-β-methylpropyl)-2-methylhydrazide was employed as the starting material and the crystalline precipitate was recrystallized from isopropyl alcohol to obtain a 2-(p-chlorophenyl)-5,6-dihydro-4,6,6-trimethyl-4H-1,3,4 - oxadiazine hydrochloride product as a white crystalline solid melting at 185°–187° C.

Example 6.—The procedure of Example 4 was successively repeated substituting for the m-toluic acid 2-(β-hydroxy-β-methylpropyl) - 2 - methylhydrazide thereof, 2-methyl-2-(β-hydroxy-β-methylpropyl)acylhydrazides having the following acyl substituents:

o-anisoyl
benzoyl
m-chlorobenzoyl
2,4-dichlorobenzoyl
3,4-dimethoxybenzoyl
3,5-dimethylbenzoyl
p-fluorobenzoyl
p-hydroxybenzoyl
3,4-methylenedioxybenzoyl
p-nitrobenzoyl
p-toluyl The products were worked up as in Example 4 except for minor changes in the final crystallization solvent to obtain the respective corresponding 2-substituted -5,6-dihydro-4,6,6-trimethyl-4H,1,3,4-oxadiazines as set forth in the following table. The products were all obtained in the form of their hydrobromide salts.

| Substituent in 2-Position | Recrystallization Solvent | Melting Point,° C. |
|---|---|---|
| o-Anisyl | Methanol-ether | 159–160 |
| Phenyl | Isopropanol | 193–194.5 |
| m-Chlorophenyl | Ethanol | 201–202 |
| 2,4-dichlorophenyl | Methanol-ether | 193–194 |
| 3,4-dimethoxyphenyl | Isopropanol | 188–189 |
| 3,5-dimethylphenyl | do | 218–219 |
| p-Fluorophenyl | do | 207–208 |
| p-Hydroxyphenyl | do | 205–207 |
| 3,4-methylenedioxyphenyl | | 212–212.5 |
| p-Nitrophenyl | Methanol-ether | 208–209 |
| p-Tolyl | Isopropanol | 177–179 |

All of the foregoing oxadiazine hydrobromides showed decomposition on melting.

Example 7.—Twenty-five grams of phenyl acetic acid 2-(β-hydroxypropyl)-2-methylhydrazide was dissolved in 500 milliliters of glacial acetic acid and the resulting solution saturated with hydrogen bromide by bubbling hydrogen bromide gas into the solution. The acetic acid was thereafter evaporated in vacuo and the residue dissolved in methanol. The methanol was diluted with diethyl ether until the ether-methanol solution became cloudy, and then chilled. Crystals did not form on chilling, and the mixture was evaporated in vacuo to remove the ether. The resulting solution was treated with a saturated aqueous solution of sodium carbonate, diluted with water and extracted with two 250-milliliter portions of diethyl ether. The ether solution was dried over magnesium sulfate and evaporated in vacuo. The residue was distilled in vacuo and a product fraction collected, boiling at about 131° C. under 3.5 millimeters of mercury. The 2-benzyl-5,6 - dihydro-4,6-dimethyl-4H-1,3,4-oxadiazine hydrobromide product was found by analysis to have carbon, hydrogen and nitrogen contents of 70.71, 7.86 and 13.89 percent, respectively, as compared with the theoretical contents of 70.60, 7.91 and 13.76 percent, respectively, as compared with the theoretical contents of 70.60, 7.91 and 13.76 percent, respectively, calculated for the named structure.

Example 8.—3,4-dichlorobenzoic acid 2-(β-hydroxypropyl)-2-methylhydrazide (35.5 grams) was dissolved in 300 milliliters of glacial acetic acid and the resulting solution saturated with gaseous hydrogen bromide by bubbling hydrogen bromide gas into the solution over a two hour period. The mixture was thereafter distilled under reduced pressure to remove the acetic acid and leave the crude product as a solid residue. The residue was triturated with a mixture of methanol and ether and a white precipitate formed. This precipitate was recrystallized from methanol and ether to obtain 2-(3,4-dichlorophenyl)-5,6-dihydro-4,6-dimethyl-4H-1,3,4-oxadiazine hydrobromide as white crystals melting at 200°–202° C. The structure was confirmed by infrared spectroscopy.

Example 9.—A solution of p-anisic acid 2-(β-hydroxypropyl)-2-methylhydrazide (40 grams) in 400 milliliters of glacial acetic acid was saturated with hydrogen bromide by bubbling hydrogen bromide gas into the solution over a period of 1.5 hours. The solution was then evaporated in vacuo to leave the crude product as a residue. The residue was dissolved in a minimum amount of methanol and the solid product precipitated by the addition of anhydrous ether. The 2-(p-anisyl)-5,6-dihydro-4,6-dimethyl-4H-1,3,4-oxadiazine hydrobromide product was recrystallized twice from isopropyl alcohol and found to melt at 168.5°–170° C.

Example 10.—p-Toluic acid 2-(β-hydroxypropyl)-2-methylhydrazide (97 grams) was dissolved in 500 milliliters of glacial acetic acid and the solution was saturated with hydrogen bromide by bubbling in hydrogen bromide gas. After about 20 minutes, a white precipitate formed. Thereafter, an additional 200 milliliters of glacial acetic acid was added and the mixture was again saturated with gaseous hydrogen bromide. The mixture was allowed to stand for 18 hours at 25° C., after which the acetic acid was evaporated from the mixture under vacuum and the residue was made basic by the addition of aqueous sodium hydroxide. The residue was distilled under reduced pressure and the product collected as a fraction boiling at 129°–133° C. under 1.0 millimeter of mercury. The 2-(p-tolyl)-5,6-dihydro-4,6-dimethyl-4H-1,3,4-oxadiazine product was found by analysis to have carbon and hydrogen contents of 69.91 and 8.10 percent, respectively, as compared with the theoretical contents of 70.55 and 7.90 percent, respectively, calculated for the named structure.

Example 11.—The procedure of Example 9 was successively repeated substituting for the p-anisic acid 2-(β-hydroxypropyl)-2-methylhydrazide thereof, 2-methyl-2-(β-hydroxypropyl)acylhydrazides having the following acyl substituents:

benzoyl
p-chlorobenzoyl
m-chlorobenzoyl
3,5-dimethylbenzoyl

The products were worked up substantially as in Example 9 to obtain the respective corresponding 2-substituted-5,6-dihydro-4,6-dimethyl-4H-1,3,4-oxadiazines in the form of their hydrobromide salts as set forth in the following table.

| Substitutent in 2-position: | Melting point, ° C. |
| --- | --- |
| Phenyl | 161–163 |
| p-Chlorophenyl | 206–207 |
| m-Chlorophenyl | 187–188 |
| 3,5-dimethylphenyl | 219–221 |

All of the foregoing oxadiazine hydrobromides showed decomposition on melting.

Example 12.—The following oxadiazine compound was prepared by tosyl displacement and ring closure of 2-methyl-2-(p-toluenesulfonyloxypropyl)-o-chlorobenzoylhydrazide in accordance with the method disclosed and claimed in my copending application, Ser No. 582,552:

2-(o-chlorophenyl) - 5,6 - dihydro-4,6-dimethyl-4H-1,3,4-oxadiazine, boiling at 152° C. under a pressure of 3.3 millimeters of mercury.

Example 13.—The following oxadiazine compounds were prepared by the base-catalyzed dehydrohalogenation of 2-methyl-2-(β-haloethyl) acid hydrazides in accordance with the method described and claimed in my copending application, Serial No. 582,548. The 2-substituted-5,6-dihydro-4-methyl-4H-1,3,4-oxadiazine compounds and their salts are set forth in the following table. The compounds all correspond to Formula VII.

| Substituent in 2-Position | n | HX | Melting Point, ° C. |
| --- | --- | --- | --- |
| p-Anisyl | 1 | HCl | *156–157 |
| m-Bromophenyl | 1 | HCl | *185–187 |
| o-Chlorophenyl | 1 | HCl | *179–180 |
| p-Chlorophenyl | 0 | | 48–49 |
| 3,4-dichlorophenyl | 0 | | 48–49 |
| 2-furyl | 1 | HCl | 171–172 |
| Phenyl | 1 | HCl | *145–146.5 |
| p-Tolyl | 1 | HCl | *175–176 |
| 3,4,5-trimethoxyphenyl | 1 | HCl | *169–170 |

*The foregoing compounds marked with an asterisk showed decomposition on melting.

Example 14.—The following oxadiazine compounds were prepared from an ethylene dihalide and an acid hydrazide in accordance with the method described and claimed in my copending application, Ser. No. 582,550 to obtain the 2-substituted-5,6 - dihydro - 4H - 1,3,4 - oxadiazine compounds set forth in the following table. The compounds all correspond to Formula VIII.

| Substitutent in 2-Position | n | HX | Recrystallization Solvent | Melting Point,° C. |
| --- | --- | --- | --- | --- |
| 3,4-dichlorophenyl | 0 | | Ethanol | 48–49 |
| Phenyl | 1 | HCl | Ethanol-ethyl acetate | *173–174 |
| p-Tolyl | 1 | HCl | Methanol-diethyl ether | *188–189 |
| 3,4,5-trimethoxyphenyl | 1 | HCl | Ethanol | *168 |

*The oxadiazine compounds marked with an asterisk showed decomposition on melting.

The new oxadiazine compounds have utility as anticonvulsants and particularly as antagonists to strychnine-induced convulsions in small rodents. Thus, the compounds can be employed to study the mechanism of drug action in the central nervous system of rodents. 2-(m-chlorophenyl) - 5,6 - dihydro - 4,6,6 - trimethyl - 4H - 1,3,4-oxadiazine hydrobromide and 2-(m-tolyl)-5,6-dihydro-4,6,6 - trimethyl-4H-1,3,4-oxadiazine hydrobromide, representative of the compounds of the invention, were separately dispersed in sterile water to prepare an injectable composition. Each such composition was injected intraperitoneally at a dosage of 200 milligrams per kilogram every 24 hours for three treatments into groups of ten albino mice for each compound. One hour after the third injection, the mice were challenged with an intraperitoneal injection of strychnine at a dosage of two milligrams per kilogram. This dose of strychnine gives substantially 100 percent lethality in untreated control mice. Excellent protection of the treated mice against strychnine convulsions and death was obtained with each of the test compounds. In similar operations, each of the compounds, 2-(2-furyl)-5,6-dihydro-4-methyl-4H-1,3,4 - oxadiazine hydrochloride, 2 - (3,4,5 - trimethoxyphenyl) - 5,6 - dihydro - 4 - methyl- 4H-1,3,4-oxadiazine hydrochloride and 2 - (3,4 - dichlorophenyl)-5,6-dihydro-4H-1,3,4 - oxadiazine gave excellent protection of treated mice against strychnine convulsions and death when administered by intraperitoneal injection at a dosage of 100 milligrams per kilogram.

In other operations, each of the compounds 2-phenyl-5,6-dihydro-4-methyl-4H-1,3,4-oxadiazine hydrochloride, 2-(o-chlorophenyl)-5,6-dihydro - 4 - methyl - 4H - 1,3,4-oxadiazine hydrochloride and 2-(p-chlorophenyl)-5,6-dihydro-4-methyl-4H-1,3,4-oxadiazine gave excellent protection of treated mice against convulsions induced by electroshock when administered separately to the mice by intraperitoneal injection at a dosage of 200 milligrams per kilogram.

The novel oxadiazine compounds also have central nervous system activity as indicated by their effectiveness in prolonging hexobarbital sleep time in mice. In these determinations, the mice received a dosage of one of the oxadiazine compounds at a rate of 100 or 200 milligrams per kilogram one hour before intraperitoneal administration of hexobarbital at a dosage rate of 100 milligrams per kilogram. Untreated control mice were similarly injected with hexobarbital at a dosage rate of 100 milligrams per kilogram to serve as checks. The hexobarbital injections induced sleep in the mice. All the animals were then placed on their backs and the period of time until each mouse spontaneously turned over and righted itself was recorded as sleep time. The ratio of the average sleep time for the treated mice to that for the untreated mice is expressed as hexobarbital sleep time ratio in the following table.

| R | $R_1$ | $R_2$ | $R_4$ | $y$ | HX | Hexobarbital Sleep Time Ratio |
|---|---|---|---|---|---|---|
| p-Anisyl | $CH_3$ | H | H | 1 | HCl | 2.5 |
| Do | $CH_3$ | $CH_3$ | H | 1 | HBr | 1.3 |
| m-Bromophenyl | $CH_3$ | H | H | 1 | HCl | 3.1 |
| o-Chlorophenyl | $CH_3$ | H | H | 1 | HCl | 6.8 |
| p-Chlorophenyl | $CH_3$ | H | H | 0 | | 2.8 |
| Do | $CH_3$ | $CH_3$ | H | 1 | HBr | 2.7 |
| 3,4-dichlorophenyl | H | H | H | 0 | | 4.9 |
| Do | $CH_3$ | $CH_3$ | H | 1 | HBr | 2.9 |
| 2-furyl | $CH_3$ | H | H | 1 | HCl | 2.0 |
| Phenyl | H | H | H | 1 | HCl | [1] 1.6 |
| Do | $CH_3$ | H | H | 1 | HCl | [2] 3.0 |
| Do | $CH_3$ | $CH_3$ | H | 1 | HBr | 2.7 |
| p-Tolyl | $CH_3$ | H | H | 1 | HCl | 2.6 |
| 3,4,5-trimethoxyphenyl | $CH_3$ | H | H | 1 | HCl | [3] 3.1 |

[1] In other operations, 2-phenyl-5,6-dihydro-4H-1,3,4-oxadiazine hydrochloride was found to be especially advantageous as a monoaminoxidase inhibitor because of the rapid onset of its effects.
[2] 2-phenyl-5,6-dihydro-4-methyl-4H-1,3,4-oxadiazine hydrochloride was administered at a dosage rate of 200 milligrams per kilogram. The other compounds were administered at a dosage rate of 100 milligrams per kilogram.
[3] In other operations, 2-(3,4,5-trimethoxyphenyl)-5,6-dihydro-4-methyl-4H-1,3,4-oxadiazine hydrochloride was found to be of particular utility as a hypnosedative in several species of laboratory animals.

The compounds of the present invention corresponding to Formulae II, VII and VIII can be employed as the sole toxicant in pesticides for the control of various pests such as nematodes, plants and fungi.

For such uses, the compounds can be employed in an unmodified form or dispersed on a finely divided solid and employed as dusts. Such mixtures also can be dispersed in water with or without the aid of a surface active agent, and the resulting aqueous suspensions employed as sprays. In other procedures, the products are employed as active constituents in solvent solutions, oil-in-water or water-in-oil emulsions or aqueous dispersions. The augmented compositions are adapted to be formulated as concentrates and subsequently diluted with additional liquid or solid adjuvants to produce the ultimate treating compositions.

The toxicant compounds of the present invention and the compositions containing these compounds are introduced into the various environments by such conventional techniques as spraying, dusting and drenching. The exact concentration of the novel compounds to be employed in the treating compositions is not critical and may vary considerably provided the required amount of effective agent is supplied on the plant, plant part, soil and the aqueous environment, and so forth.

In representative operations, each of the compounds 2 - (3,4-dichlorophenyl) - 5,6-dihydro-4-methyl-4H-1,3,4-oxadiazine, 2 - (3,4,5 - trimethoxyphenyl) - 5,6-dihydro-4-methyl-4H-1,3,4-oxadiazine hydrochloride, 2-(m-bromophenyl)-5,6-dihydro-4-methyl-4H-1,3,4-oxadiazine hydrochloride and 2 - (p-butoxyphenyl) - 5,6-dihydro-4,6,6-trimethyl-4H-1,3,4-oxadiazine hydrochloride was found to give good control of bean mildew when separate aqueous compositions each containing one of said compounds as the sole toxicant therein at a toxicant concentration of 6000 parts per million were applied to bean plants which were subsequently inoculated with spores of the bean mildew organism. In other operations, separate compositions each containing one of the compounds 2-(p-chlorophenyl)-5,6-dihydro-4-methyl-4H-1,3,4-oxadiazine and 2-(p-tolyl) - 5,6-dihydro-4-methyl-4H - 1,3,4-oxadiazine hydrochloride gave substantially complete inhibition of *Aspergillus terreus*, *Candida albicans* and *Pullularia pullulans* when added to separate fungal culture media as the sole toxicant and in an amount sufficient to provide a toxicant concentration of 0.1 percent by weight of culture medium and the culture media were subsequently inoculated with the above-named organisms. In other operations, each of the compounds 2-(o-chlorophenyl)-5,6-dihydro-4-methyl-4H-1,3,4-oxadiazine hydrochloride and 2 - (m - bromophenyl) - 5,6 - dihydro - 4-methyl-4H-1,3,4-oxadiazine hydrochloride gave substantially complete inhibition of *Trichophyton mentagrophytes* when aqueous compositions containing the above compounds as the sole toxicant at a toxicant concentration of 300 parts per million were added to the culture media inoculated with the named organism.

Certain of the above-described oxadiazine compounds can also be used in anthelmintic compositions. In representative operations, each of 2-(3,4-dichlorophenyl)-5,6 - dihydro - 4 - methyl - 4H - 1,3,4-oxadiazine and 2-(p-chlorophenyl) - 5,6-dihydro-4-methyl-4H-1,3,4-oxadiazine were found to give substantially complete control of round worm species in separate incubated samples of calf feces infested with said round worms and treated with one of the oxadiazine compounds at a concentration of 300 parts per million, while similar portions of calf feces which were not treated with oxadiazine compounds were found to support abundant growth of said round worm species.

I claim:
1. A compound selected from the group of 1,3,4-oxadiazine compounds corresponding to the formula

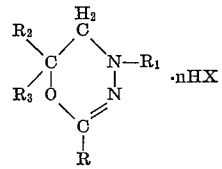

wherein R represents a member of the group consisting of furyl, benzyl, styryl, methylenedioxyphenyl, phenyl and substituted phenyl, in which substituted phenyl represents a member of the group consisting of halophenyl, alkoxyphenyl, alkylphenyl, hydroxyphenyl and nitrophenyl groups, said substituted phenyl groups being substituted with from 1, to 2, to 3 substituents selected from the group consisting of fluorine, chlorine, bromine, nitro, hydroxy, lower alkyl groups containing from 1 to 4 carbon atoms, inclusive, and lower alkoxy groups containing from 1 to 4 carbon atoms, inclusive, $R_1$, $R_2$ and $R_3$ each independently represent a member of the group consisting of hydrogen and methyl, HX represents a member of the group consisting of hydrochloride and hydrobromide and $n$ represents an integer from zero to 1.

2. The compound of claim 1 selected from the group consisting of 2-halophenyl-5,6-dihydro-4,6,6-trimethyl-4H-1,3,4-oxadiazine and the hydrochloride and hydrobromide salts thereof.

3. The compound of claim 2 wherein the compound is 2-dichlorophenyl-5,6-dihydro-4,6,6 - trimethyl-4H - 1,3,4-oxadiazine.

4. The compound of claim 2 wherein the compound is 2-chlorophenyl-5,6-dihydro-4,6,6-trimethyl - 4H-1,3,4-oxadiazine.

5. The compound of claim 4 wherein the compound is 2-(m-chlorophenyl)-5,6-dihydro-4,6,6-trimethyl-4H-1,3,4-oxadiazine.

6. The compound of claim 1 selected from the group consisting of 2-alkylphenyl-5,6-dihydro-4,6,6-trimethyl-4H-1,3,4-oxadiazine and the hydrochloride and hydrobromide salts thereof.

7. The compound of claim 6 wherein the compound is 2-(m-tolyl)-5,6-dihydro-4,6,6-trimethyl-4H-1,3,4-oxadiazine.

8. The compound of claim 1 selected from the group consisting of 2-alkoxyphenyl-5,6-dihydro-4,6,6-trimethyl-4H-1,3,4-oxadiazine and the hydrochloride and hydrobromide salts thereof.

9. The compound of claim 8 wherein the compound is 2-(p-butoxyphenyl)-5,6-dihydro-4,6,6-trimethyl-4H-1,3,4-oxadiazine hydrochloride.

10. The compound of claim 1 selected from the group consisting of 2-halophenyl-5,6-dihydro-4,6-dimethyl-4H-1,3,4-oxadiazine and the hydrochloride and hydrobromide salts thereof.

11. The compound of claim 10 selected from the group consisting of 2-dichlorophenyl-5,6-dihydro-4,6-dimethyl-4H-1,3,4-oxadiazine and the hydrochloride and hydrobromide salts thereof.

12. The compound of claim 11 wherein the compound is 2-(3,4-dichlorophenyl)-5,6-dihydro-4,6-dimethyl-4H-1,3,4-oxadiazine hydrobromide.

13. The compound of claim 1 selected from the group consisting of 2-halophenyl-5,6-dihydro-4-methyl-4H-1,3,4-oxadiazine and the hydrochloride and hydrobromide salts thereof.

14. The compound of claim 13 wherein the compound is 2-(3,4-dichlorophenyl)-5,6-dihydro-4-methyl-4H-1,3,4-oxadiazine.

15. The compound of claim 13 wherein the compound is 2-(m-bromophenyl)-5,6-dihydro-4-methyl-4H-1,3,4-oxadiazine hydrochloride.

16. The compound of claim 13 wherein the compound is 2-(o-chlorophenyl)-5,6-dihydro-4-methyl-4H-1,3,4-oxadiazine hydrochloride.

17. The compound of claim 13 wherein the compound is 2-(p-chlorophenyl)-5,6-dihydro-4-methyl-4H-1,3,4-oxadiazine hydrochloride.

18. The compound of claim 1 wherein the compound is 2-(2-furyl)-5,6-dihydro-4-methyl-4H-1,3,4-oxadiazine hydrochloride.

19. The compound of claim 1 selected from the group consisting of 2-alkoxyphenyl-5,6-dihydro-4-methyl-4H-1,3,4-oxadiazine and the hydrochloride and hydrobromide salts thereof.

20. The compound of claim 19 selected from the group consisting of 2-trimethoxyphenyl-5,6-dihydro-4-methyl-4H-1,3,4-oxadiazine and the hydrochloride and hydrobromide salts thereof.

21. The compound of claim 20 wherein the compound is 2-(3,4,5-trimethoxyphenyl) 5,6-dihydro-4-methyl-4H-1,3,4-oxadiazine hydrochloride.

22. The compound of claim 1 wherein the compound is 2-phenyl-5,6-dihydro-4-methyl-4H-1,3,4-oxadiazine hydrochloride.

23. The compound of claim 1 selected from the group consisting of 2-alkylphenyl-5,6-dihydro-4-methyl-4H-1,3,4-oxadiazine and the hydrochloride and hydrobromide salts thereof.

24. The compound of claim 23 wherein the compound is 2-(p-tolyl)-5,6-dihydro-4-methyl-4H-1,3,4 - oxadiazine hydrochloride.

25. The compound of claim 1 wherein the compound is selected from the group consisting of 2-phenyl-5,6-dihydro-4H-1,3,4-oxadiazine and the hydrochloride and hydrobromide salts thereof.

26. The compound of claim 25 wherein the compound is 2-phenyl-5,6-dihydro-4H-1,3,4-oxadiazine hydrochloride.

27. The compound of claim 1 selected from the group consisting of 2-halophenyl-5,6-dihydro - 4H-1,3,4-oxadiazine and the hydrochloride and hydrobromide salts thereof.

28. The compound of claim 27 wherein the compound is 2-(3,4-dichlorophenyl) - 5,6-dihydro-4H-1,3,4 - oxadiazine.

29. A method for the preparation of a compound corresponding to the formula

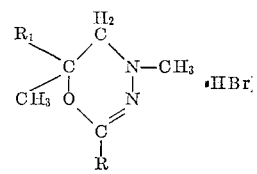

wherein R represents a member of the group consisting of furyl, benzyl, styryl, methylenedioxyphenyl, phenyl and substituted phenyl, in which substituted phenyl represents a member of the group consisting of halophenyl, alkoxyphenyl, alkylphenyl, hydroxyphenyl and nitrophenyl groups, said substituted phenyl group being substituted with from 1, to 2, to 3 substituents selected from the group consisting of fluorine, chlorine, bromine, hydroxy, nitro, lower alkyl groups containing from 1 to 4 carbon atoms, inclusive, and lower alkoxy groups containing from 1 to 4 carbon atoms, inclusive, and $R_1$ represents a member of the group consisting of hydrogen and methyl, which comprises dissolving a β-hydroxyalkyl acylhydrazide of the formula

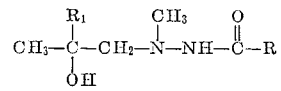

in glacial acetic acid, saturating the resulting solution with hydrogen bromide and thereafter removing acetic acid and excess hydrogen bromide by distillation under vacuum.

References Cited

UNITED STATES PATENTS

| | | | |
|---|---|---|---|
| 3,119,821 | 1/1964 | Trepanier | 260—244 |
| 3,122,537 | 2/1964 | Trepanier | 260—244 |
| 2,873,582 | 2/1959 | Green | 62—52 X |

OTHER REFERENCES

Trepanier et al., J. Org. Chem., vol. 29, No. 3, pp. 773–776 (March 1964).

HENRY R. JILES, *Primary Examiner.*

R. T. BOND, *Assistant Examiner.*

U.S. Cl. X.R.

424—248